(12) United States Patent
D'Ercoli et al.

(10) Patent No.: US 11,138,504 B2
(45) Date of Patent: Oct. 5, 2021

(54) DEPLOYMENT OF DEEP NEURAL NETWORKS (DNN) IN EMBEDDED DEVICES BY MEANS OF PEER-TO-PEER ROUTING BETWEEN COMPUTATIONAL POINTS

(71) Applicant: Datalogic IP Tech S.r.l., Calderara di Reno (IT)

(72) Inventors: Francesco D'Ercoli, Bologna (IT); Federica Albertini, Forli (IT)

(73) Assignee: Datalogic IP Tech S.R.L., Calderara di Reno (IT)

(*) Notice: Subject to any disclaimer, the term of this patent is extended or adjusted under 35 U.S.C. 154(b) by 54 days.

(21) Appl. No.: 16/236,054

(22) Filed: Dec. 28, 2018

(65) Prior Publication Data

US 2020/0210834 A1 Jul. 2, 2020

(51) Int. Cl.
| | |
|---|---|
| G06K 9/62 | (2006.01) |
| G06N 3/08 | (2006.01) |
| G06F 9/50 | (2006.01) |
| G06F 9/54 | (2006.01) |
| G06K 9/48 | (2006.01) |
| H04L 29/08 | (2006.01) |

(52) U.S. Cl.
CPC ........... *G06N 3/082* (2013.01); *G06F 9/5077* (2013.01); *G06F 9/542* (2013.01); *G06K 9/481* (2013.01); *G06K 9/6267* (2013.01); *H04L 67/1053* (2013.01)

(58) Field of Classification Search
CPC ....... G06N 3/082; G06F 9/542; G06F 9/5077; G06K 9/6267; G06K 9/481; H04L 67/1053
See application file for complete search history.

(56) References Cited

U.S. PATENT DOCUMENTS

| | | | | |
|---|---|---|---|---|
| 2011/0314467 | A1* | 12/2011 | Pearson | .............. H04L 47/2475 718/1 |
| 2015/0038102 | A1* | 2/2015 | Yoakum | ............ H04M 3/42221 455/404.1 |

(Continued)

FOREIGN PATENT DOCUMENTS

WO 2017003837 A1 1/2017

OTHER PUBLICATIONS

Sutton et al. "Partitioned Neural Networks," http://www.leemon.com/papers/2009scsb.pdf, 2009, 6 pages.

(Continued)

*Primary Examiner* — Solomon G Bezuayehu

(74) *Attorney, Agent, or Firm* — Foley & Lardner LLP

(57) ABSTRACT

A system and method of executing a deep neural network (DNN) in a local area network (LAN) may include executing a partitioned deep neural network in multiple computational nodes (CPs) in devices operating on the LAN. An image frame may be captured by a device. The image frame may be processed by a first layer of the partitioned neural network by a CP operating on the device. In response to the device that captured the image frame determining to request processing assistance from another CP, a request using a peer-to-peer protocol to other CPs on the LAN may be performed. A feature map may be communicated to another CP selected using the peer-to-peer protocol to process the feature map by a next layer of the DNN.

14 Claims, 12 Drawing Sheets

(56) References Cited

U.S. PATENT DOCUMENTS

| | | | |
|---|---|---|---|
| 2016/0379108 A1* | 12/2016 | Chung | G06N 3/04 |
| | | | 706/27 |
| 2018/0157465 A1* | 6/2018 | Bittner | G06F 17/16 |
| 2018/0232639 A1* | 8/2018 | Lin | G06N 3/063 |
| 2018/0330238 A1* | 11/2018 | Luciw | G06N 3/0445 |
| 2019/0026538 A1* | 1/2019 | Wang | G06K 9/4642 |
| 2019/0258919 A1* | 8/2019 | Lie | G06F 17/16 |
| 2019/0342356 A1* | 11/2019 | Thomas | H04N 21/234309 |
| 2019/0355142 A1* | 11/2019 | Croxford | G06T 7/60 |
| 2020/0020097 A1* | 1/2020 | Do | G06K 9/627 |
| 2020/0117954 A1* | 4/2020 | Jiang | G06N 3/0454 |

OTHER PUBLICATIONS

Dean et al, "Large Scale Distributed Deep Networks," NIPS'12: Proceedings of the 25th International Conference on Neural Information Processing Systems—vol. 1; Dec. 2012, 9 pages.

Kang et al., "Neurosurgeon: collaborative intelligence between the cloud and mobile edge," https://blog.acolyer.org/2017/05/25/neurosurgeon-collaborative-intelligence-between-the-cloud-and-the-mobile-edge/, May 25, 2017, 8 pages.

Teerapittayanon, et al., "Distributed deep neural networks over the cloud, the edge, and end devices," https://blog.acolyer.org/2017/09/22/distributed-deep-neural-networks-over-the-cloud-the-edge-and-end-devices, Sep. 22, 2017, 12 pages.

Guo et al. "[DL] A Survey of FPGA-Based Neural Network Inference Accelerator," https://arxiv.org/pdf/1712.08934.pdf, Dec. 6, 2018, pp. 11:1-11:26.

* cited by examiner

DEPLOYMENT OF DEEP NEURAL NETWORKS (DNN) IN EMBEDDED DEVICES BY MEANS OF PEER-TO-PEER ROUTING BETWEEN COMPUTATIONAL POINTS

BACKGROUND

In very recent years, deep learning has become the state-of-the-art in computer or machine vision, and has recently migrated into fields in which embedded imaging devices are being used that have heretofore not been possible. Deep learning is a machine learning technique that may be supervised, semi-supervised, or unsupervised. The so called "deep" family of machine learning methods, both supervised or unsupervised, are all based on different variants of few artificial neural network architecture, most notably feedforward, convolutional, recurrent, and reinforcement neural networks (each architecture fits for specific domains).

In each case, Deep Neural Networks (DNN) use a cascade of multiple layers of nonlinear processing units (multilayer perceptrons) for feature extraction and transformation, with each successive layer using the output from the previous layer as input, in order to be capable of learning multiple levels of abstraction combined in a hierarchy of patterns. Deep neural networks are more often being used to help machines determine types of objects, for example, captured in images captured by a camera of a machine.

Apart of the problem to improve learning speed and accuracy in DNN, the big challenge remains computation time. Even as strong advances in DNN-enabled hardware have been achieved in 2009 in the form of DNNs being trained on graphics processing units (GPUs), as of today, it is still very difficult to deploy deep neural networks in an effective way on resource-constrained embedded devices, such as smart cameras and vision sensors. There have been many attempts to address the "embedded DNN problem," including the following:

(a) Cloud-Based DNN Hosting: Hosting all DNN computation on high-end cloud servers (or also locally-hosted bare metal servers) to take advantage of powerful clusters of GPUs have been found to have high end-to-end inference latency (i.e., time between input data from device to host and output from Cloud to the device) and relevant energy consumption (e.g. battery drain due to 3G/4G, BTE or Wi-Fi intensive connections). The latency and energy consumption problems have been found to be too excessive for many networked edge devices (e.g., cameras and sensors).

(b) FPGA-based hardware acceleration for DNN, especially convolutional DNN, is often capable of providing better performance per watt of power consumption than GPUs when convolution and pooling computations are involved. The performance per watt has recently been converging with system-on-chip (SoC) approaches, where a multi-core ARM processor is usually combined with an FPGA or even a dedicated GPU. However, FPGA solutions are also unsatisfactory for networked edge devices.

DNN Partitioning: Partitioning of the DNN among many devices, includes splitting a DNN in order to have some layers processed on an edge device (e.g. laptop, smartphone, tablet or other smart sensors), and some layers in the cloud. As with other cloud solutions, the latency with even a partial cloud solution for DNN processing may be bandwidth prohibited.

Distributed DNN: Distributed DNNs have also been proposed, where a distributed DNN distributes the needed computations through cloud, edge (fog), and geographically distributed end devices. While training is done on the cloud, the inference is performed on end devices, in some cases by following a consensus/ensemble approach.

ASIC-based approach: Google's TPU, which can outperform GPUs, has similar limitations as other approaches described above in terms of having latency and/or having too much energy consumption for network edge devices.

As shown in FIG. 1, an illustration of an illustrative local area network 100 inclusive of edge devices 102a-102n (collectively 102) in communication with a local area network (LAN) network access device 104 that communicates with a gateway/router 106. A mobile client may also be in communication with the gateway/router 106, which is in communication with the cloud 108. The cloud 108 includes a cloud server 110 and GPUs 112a-112n. In operation, each of the edge devices 102 execute DNNs 114a-114n, the mobile client executes a DNN 116, and the cloud executes a DNN 118. As described above, the edge devices 102 are power limited, and communications between the LAN network access device 104, gateway/router 106, and cloud 108 are problematic from a latency standpoint despite being able to execute the DNN 118 at high bandwidths. As such, real-time DNN functionality is not possible on local area networks.

Other solutions have attempted to use load balancing algorithms to provide for a scalable solution for huge parallel computing involving distributed file systems and cloud technologies (e.g., Hadoop). Other approaches are based on distributed agents that collect information on the busy/free status of various nodes in a network (e.g., SNMP). These solutions, however, are typically not suited for imagers working in real-time application on a local area network (e.g., based on Ethernet or some kind of wireless) because load balancing algorithms usually involve complex scheduling algorithms, dedicated hardware (e.g., such as a multilayer switch), and Cloud-based resources (databases, distributed file systems, security measures, etc.).

On the other side, trivial solutions, such as a fixed delivery order following a given topology, are far from optimal because the trivial solutions lose in both flexibility and ability to adapt the load according to the overloaded CPs in a certain application or moment of time (i.e., computational points (CPs) as imagers that are currently expected to process more frames per second than others).

In the next few years, deep learning will probably become a key differentiating factor for machine vision and auto-identification of embedded devices. However, in order for deep learning to be adopted into local area networks, the problems of cloud processing latency and energy usage have to be solved in order to take advantage of deep learning by edge devices on local area networks.

SUMMARY

To overcome the problems of cloud computing latency and energy consumption in performing deep learning algorithms, the principles described herein provide for the use of a peer-to-peer algorithm using handshakes between edge devices within a local area network. Resources within a local network may be optimized to provide for performing deep learning algorithms at edge devices operating on the local area network. In doing so, variable partitioning patterns may be combined with dedicated peer-to-peer protocol for features maps routing.

One embodiment of a method of executing a deep neural network (DNN) in a local area network (LAN) may include executing a partitioned deep neural network in multiple computational nodes (CPs) in devices operating on the LAN. An image frame may be captured by a device. The image frame may be processed by a first layer of the partitioned neural network by a computational point operating on the device that captured the image frame. In response to the device that captured the image frame determining to request processing assistance from another CP, a request using a peer-to-peer protocol to other CPs on the LAN may be performed. A feature map may be communicated to another CP selected using the peer-to-peer protocol to process the feature map by a next layer of the DNN.

One embodiment of a system for executing a deep neural network (DNN) in a local area network (LAN) may include multiple devices operating on the LAN, where the devices execute computational points (CPs) that are configured to execute a partitioned deep neural network thereby. A device of the devices operating on the LAN may capture an image frame. A computational point operating on the device may be configured to process the image frame by a first layer of the partitioned neural network. In response to a CP operating on the device that captured the image frame determining to request processing assistance from another CP, performing a request using a peer-to-peer protocol to other devices on the LAN. A feature map may be communicated to another CP selected using the peer-to-peer protocol to process the feature map by a next layer of the DNN.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
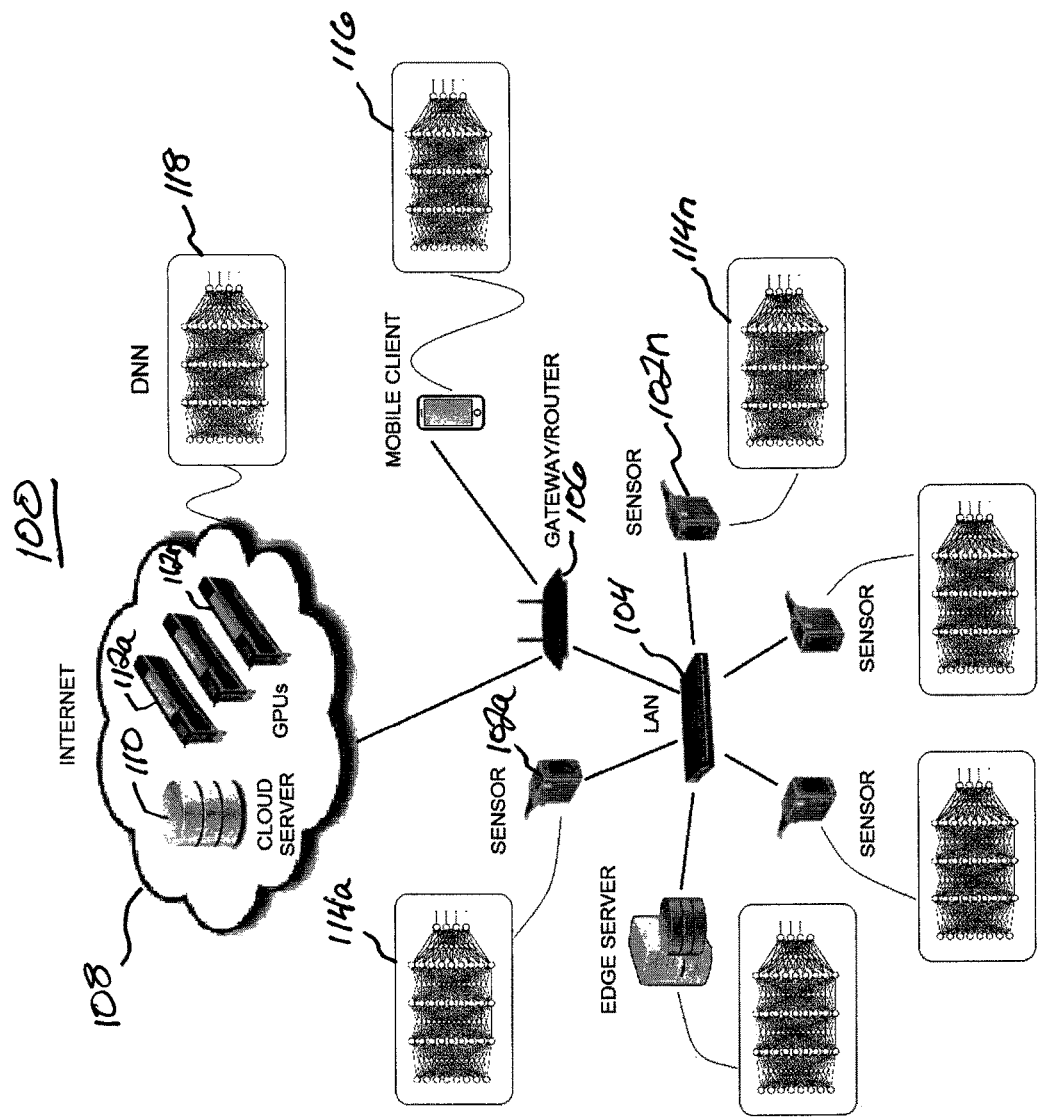
FIG. 1 is an illustration of an illustrative local area network inclusive of edge devices in communication with a local area network (LAN) network access device that communicates with a gateway/router.
Figure 2:
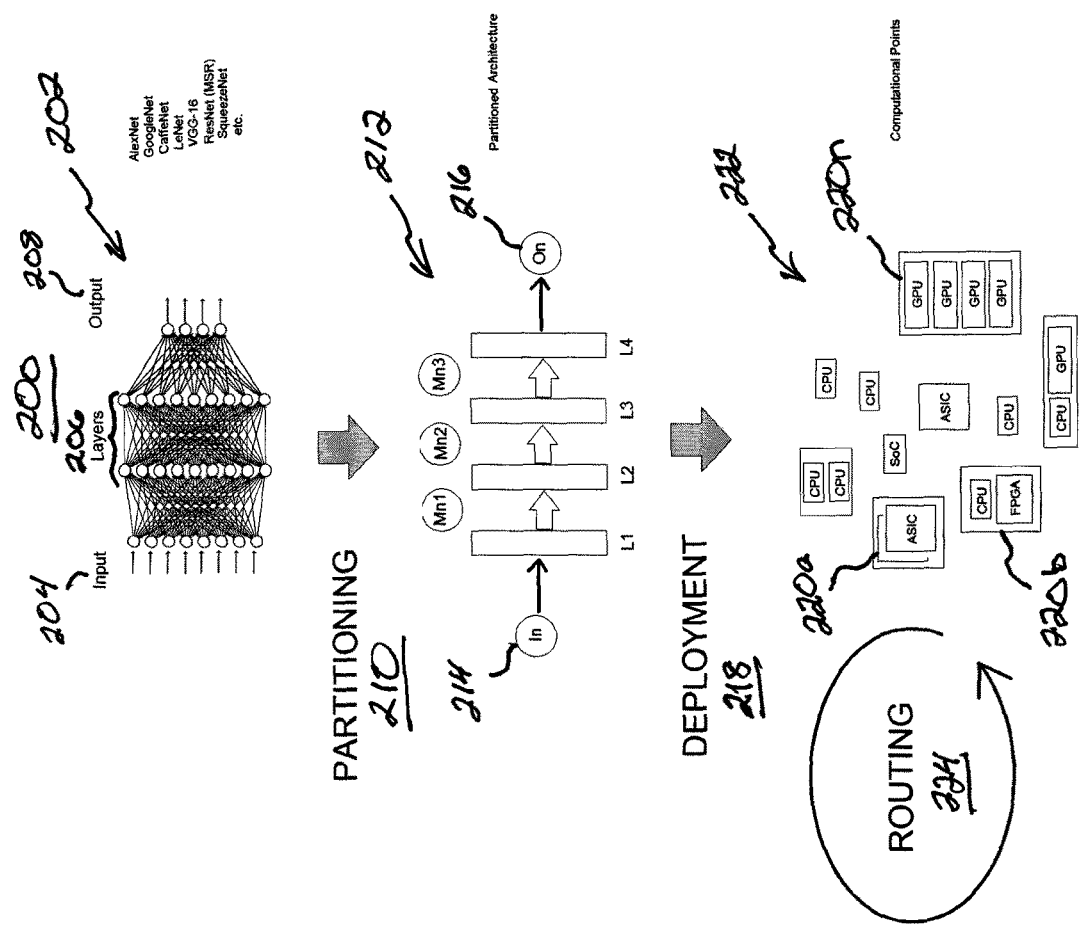
FIG. 2, an illustration of an illustrative process for deploying a deep neural network (DNN)

With regard to FIG. 2, an illustration of an illustrative process for deploying a deep neural network (DNN) 202 is shown. The DNN 200 includes an input layer 204 for receiving input data (e.g., image), multiple hidden layers 206 of non-linear processing units that are used to perform feature extraction and transformation, and output layer 208. The DNN 200 includes a certain topology/type (e.g., AlexNet, GoogleNet, etc.).

At step 210, the DNN 200 may be partitioned according to a certain criteria depending on the original topology (e.g., minimizing the total amount of data on the edge of each layer while keeping the total number of calculations in each layer fairly constant) to form a partitioned DNN 212 having multiple layers L1-L4. After performing the partitioning 210 on the DNN 200, each of the layers L1-L4 includes one or more of the original DNN's layers 204, 206, and 208, so that a defined set of input data ("In") 214, feature maps ("Mni") Mn1, Mn2, and Mn3, and output data ("On") 216 may be assigned to each of the layers L1-L4.

At step 218, a deployment of the partitioned DNN 212 may be performed. Deployment of the partitioned DNN 212 may be performed once at a design-time, and includes implementing the entire partitioned DNN 212 or only some of its layers L1-L4, in the case of computational points (CPs) 220a-220n (collectively 220) with limited resources that are part of a local area network 222. The CPs 220 may be one or more computing devices that operate within devices of the LAN 222. As understood in the art, CPs are different hardware and/or software devices and modules, such as those based on CPUs, ASICs, GPUs, FPGAs, and so on. For example, CP 220a may include an ASIC being executed by an imager or optical sensor device.

During operational run-time, a routing task may be performed at step 224. The routing may be implemented in every one of the devices 220 operates as a CP in order to dynamically allow each of the devices 220 to discover, in case of need, which of the other devices 220 on the network is able to provide additional computational power to accelerate the processing of locally acquired image frames. As provided herein, the image frames are not sent on the network because image frames are bulky and would penalize available bandwidth, which would impact latency of the whole local area network 222. As such, each of the devices 220 that captures image frames typically processes the images frames in at least a first L1 of the partitioned DNN 212 being executed thereon.

During runtime, in the event that one of the CPs 220 is free (e.g., has available computing bandwidth), then a requester node/device/CP 220a may send a currently processed feature map Mn1, for example, to that node 220b via a network communications path in order to free up resources of the requester node/device/CP 220a so as to be able to process other incoming data (e.g., image frame) locally.

Figure 3:
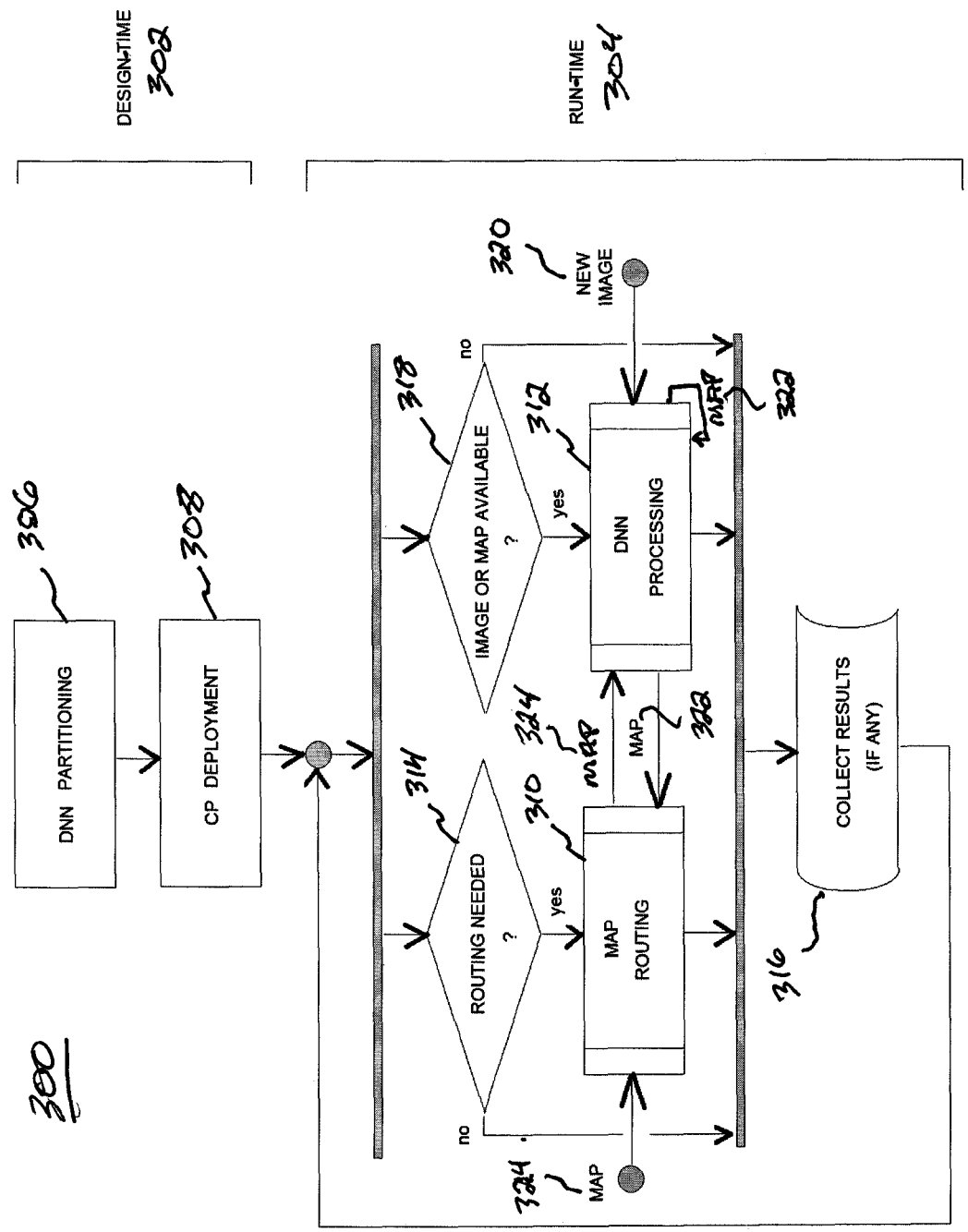
FIG. 3, an illustration of an illustrative process for operating a deep neural network using peer-to-peer communications between computational points.

With regard to FIG. 3, an illustration of an illustrative process 300 for operating a deep neural network using peer-to-peer communications between computational points is shown. The process 300 is composed of two stages, a design-time stage 302 and run-time stage 304. During the design time state 302, a DNN partitioning step 306 and CP deployment step 308 may be performed, as previously described with regard to FIG. 2. During the run-time stage 304, two parallel tasks, including a feature map routing task 310 and DNN processing task 312, are executed on each of the CPs.

The map routing task 310 is dedicated to routing management of feature maps when a determination is made by the CP that additional resources are needed due to processing bandwidth limitations. The DNN processing task 312 is configured to performing processing of incoming new images or feature maps, where the feature maps may be generated locally on a CP or being received from other CPs.

As previously described, images are not communicated on the LAN, just the feature maps.

In more detail, during the run-time stage 304, a determination may be made by a CP at step 314 as to whether routing is needed for an image map. If not, then the process continues to a collect results process at step 316. Otherwise, the process continues at step 310 for the map routing task 310 to be performed. In parallel with the routing determination of step 314, a determination may be made at step 318 as to whether a new image 320 or feature map 322 is locally available to be processed. The feature map 322 may be internal after processing a new image 320. Alternatively, a feature map 324 may be received from another CP as a result of the map routing task 310 performing a peer-to-peer communication with another CP in the network. As shown, if the DNN processing task 312 does not have sufficient DNN processing bandwidth to process the feature map 222, then the feature map 322 may be communicated in cooperation with the map routing task 310. If not, then the process continues to step 316. Otherwise, if an image or feature map is available to be processed, then the DNN processing task 312 is executed to process the image 320 or feature map 322 by one of the layers L1-L4, using the partitioning example of FIG. 2, for example, being executed by the CP. The run-time stage 304 repeats from step 316 back to the parallel determination steps 314 and 318.

Each produced result coming from the output layer of a DNN on a CP is broadcasted on the local area network and collected. It may also happen that an output result is related to an input image acquired by a different CP, which has then transmitted a certain feature map to another CP, and from this to another CP, and so on until the CP that produced the final result broadcasts the final result on the network.

Partitioning

Partitioning of a DNN, such as shown in the partitioning step 210 of FIG. 2, is performed to dispose various layers of the DNN on the CPs of the LAN. The partitioning process is customized based on the various CP resources available on the various devices operating on the LAN.

The most popular DNN model used for vision tasks is a sequential model. This type of model is a linear stack of layers, where each one has a well-defined (i) input data size, (ii) output data size, and (iii) shape. To implement the principles described herein, the DNN may be partitioned in several blocks. Theoretically it would be possible to divide the network after each level or layer, but there are some optimum splitting points of the DNN model. The determination as to where to split the DNN model is made based on a trade-off between an amount of data that is to be transferred, and the amount of computation that is to be performed at each step or layer. In an embodiment, to build a complete network, different types of layers may be constructed, as follows.

(a) Convolutional Layer: a core building block of a convolutional network that does most of the computational effort. The convolutional layer works applying a convolution operation to an input and passing a result to the next layer.

(b) Rectification Linear Unit (ReLu) Layer: activation layers to introduce non-linearity to the system.

(c) Pooling Layer: down-sampling layers to reduce the amount of parameters and reduce overfitting.

(d) Normalization Layer: layer that is useful to speed up the network training and reduce the sensitivity to network initialization.

(e) Dropout Layer: layer that "drops out" a random set of activations in that layer by setting the activations to 0 to manage overfitting problems.

(f) Fully connected: connect every neuron in one layer to every neuron in another layer, and work the same as traditional multi-layers perceptron neural network (MLP)

Each type of layer has a different latency and a different size of output data. For example, regarding data volume, in early convolutional layers of a deep neural network, the amount of data output rises quickly at the beginning and drops down after the pooling and fully connected layers. However, fully connected and convolutional layers use very high computational time and computational resources. For these reasons, the deep neural network may be divided when the data is small enough to not affect too much computation time with transfer latency. Of course, the choice of the splitting points of the DNN depends on each time on the specific DNN.

AlexNet Example

Figure 4:
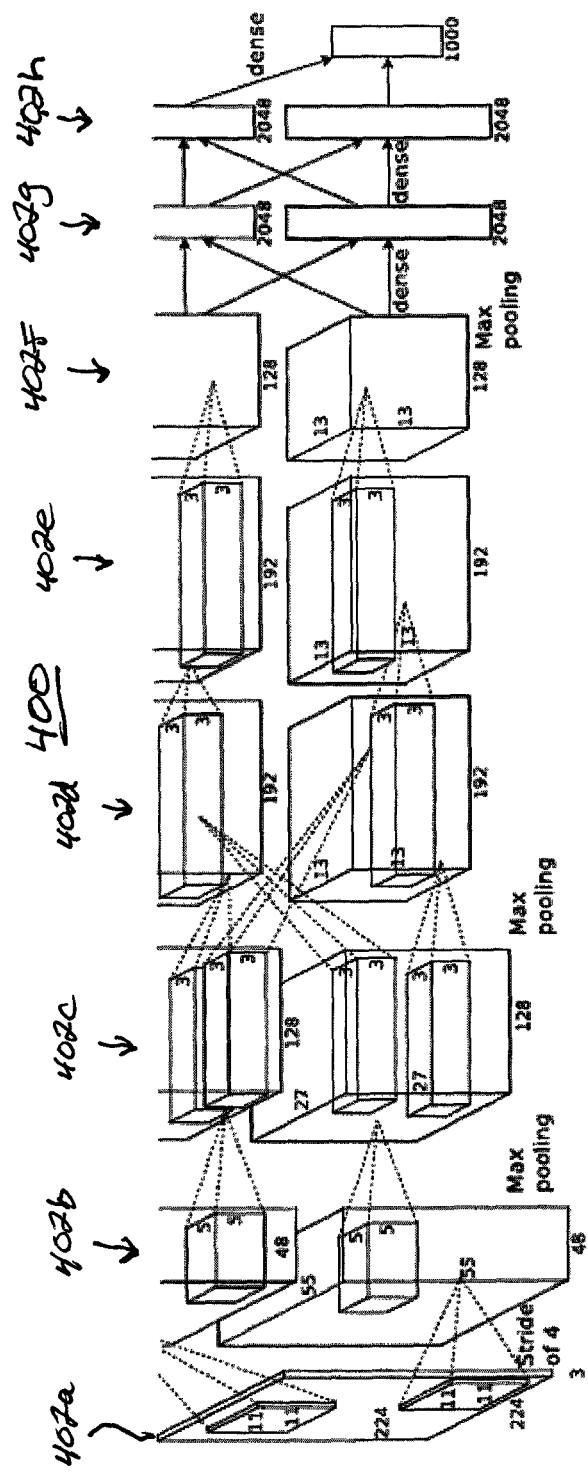
FIG. 4 is an illustrative block diagram of an AlexNet convolutional neural network (CNN)

With regard to FIG. 4, an illustrative block diagram of an AlexNet convolutional neural network (CNN) 400 is shown. By way of background, the AlexNet CNN 400 won "ImageNet Large Scale Visual Recognition Challenge (ILSVRC)" in 2012 achieving a top 5 test error rate of 15.4%, where the top 5 error is a rate at which, given an image, the neural network model does not output a correct label with the top 5 predictions of the neural network. As shown, AlexNet CNN 400 contains eight principal layers 402a-402h (collectively layers 402), where the first five layers 402a-402e are convolutional layers, and the last three layers 402f-402h are fully connected layers.

Figure 5:
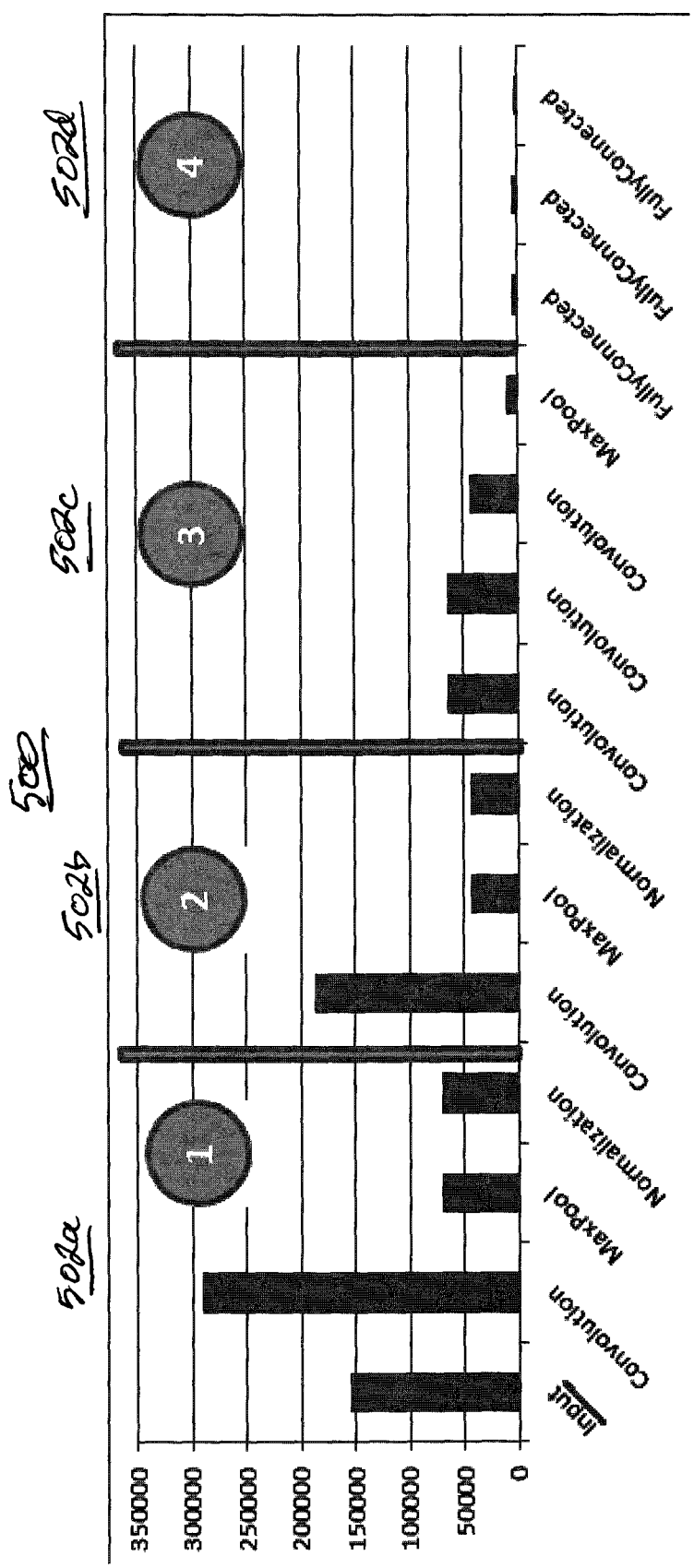
FIG. 5 is a chart showing an illustrative amount of parameters that have to be forward to a next level or partition.

With regard to FIG. 5, a chart 500 showing an illustrative amount of parameters that have to be forwarded to a next level or partition 502a-502d is shown. The data volume for each layer suggests that a partition at certain locations may be performed (i) to reduce an amount of parameters that have to be communicated and (ii) to balance the computational effort between each of the computational points. In particular, the balancing may be obtained or defined by (i) dividing the convolution layers in different blocks and (ii) transferring data only after pooling operations.

It should be understood that this partition arrangement is not the only possible partition arrangement as the splitting points can be moved or increased considering several factors, such as computational power of the CPs and/or the typology of the CPs. For example, a convolutional layer is very expensive, but is also the easiest layer to parallelize and speed up with an FPGA acceleration.

Figure 6:
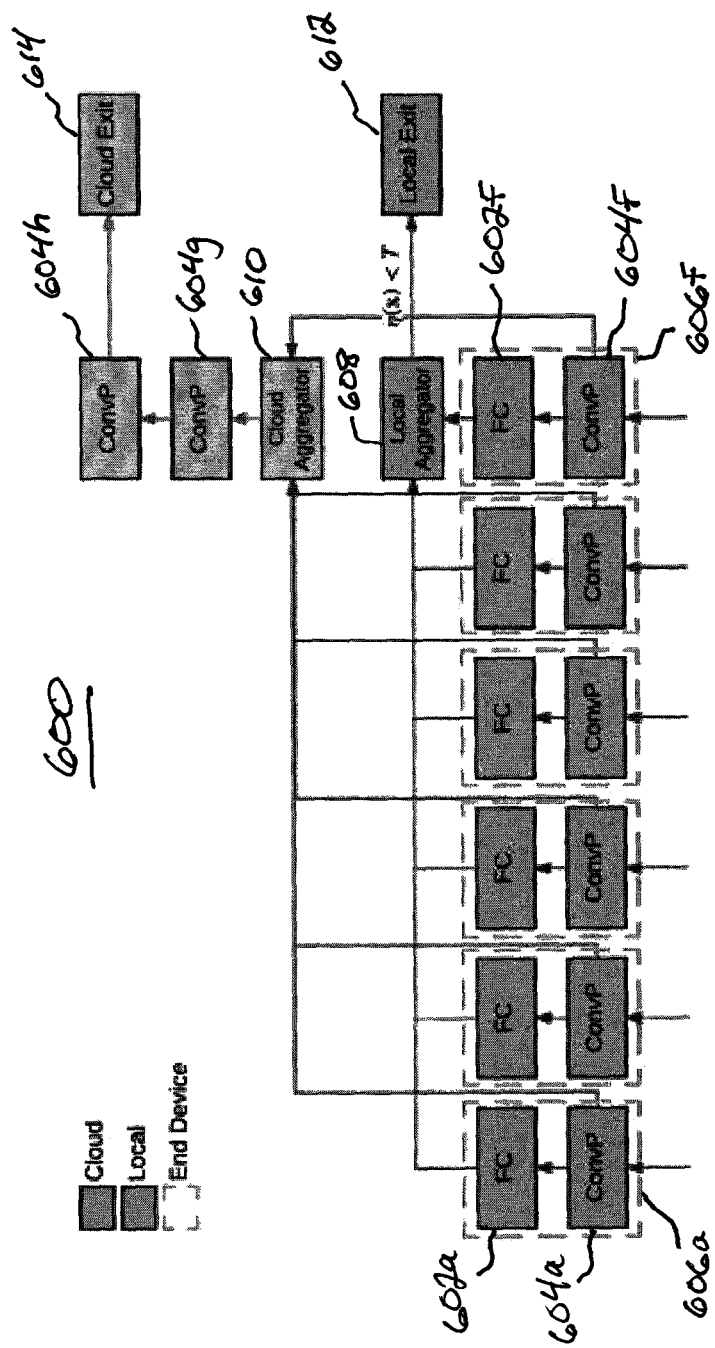
FIG. 6 is a block diagram of an illustrative distributed deep neural network (DDNN) that is configured to allow for early exit.

With regard to FIG. 6, a block diagram of an illustrative distributed deep neural network (DDNN) 600 that is configured to allow for early exit is shown. It should be also possible to partially partition a network rather than fully interconnect the layers. By partially partitioning the network, the learning may be sped up, but amount of data to be forward between blocks and the consequent communication latency has to be evaluated. Another optimization may be achieved by implementing the DDNN 600. The DDNN 600 introduces some early exits to the network to avoid useless propagations in the case of sufficiently confident results in the first computational points, as described hereinbelow.

The DDNN 600 includes fully connected (FC) 602a-602f (collectively 602) blocks and convolutional (ConvP) blocks 604a-604f (collectively 604) being executed on end devices 606a-606f (collectively 606). A local aggregator 608 combines an exit output (e.g., a short vector with a length equal to the number of classes) from each of the end devices 606 in order to determine if local classification for the given input sample can be performed accurately. If the local exit is not confident (i.e., $\eta(x) > T$), the activation output after the last convolutional layer from each of the devices 606 is sent to a cloud aggregator 610. The cloud aggregator 610 aggregates the input from each of the devices 606 and performs further neural network layer processing to output a final classification result. Once the deep neural network is completed and a classification of an object is made, a local exit 612 and/or cloud exit 614 occurs.

Deployment

Figure 7:
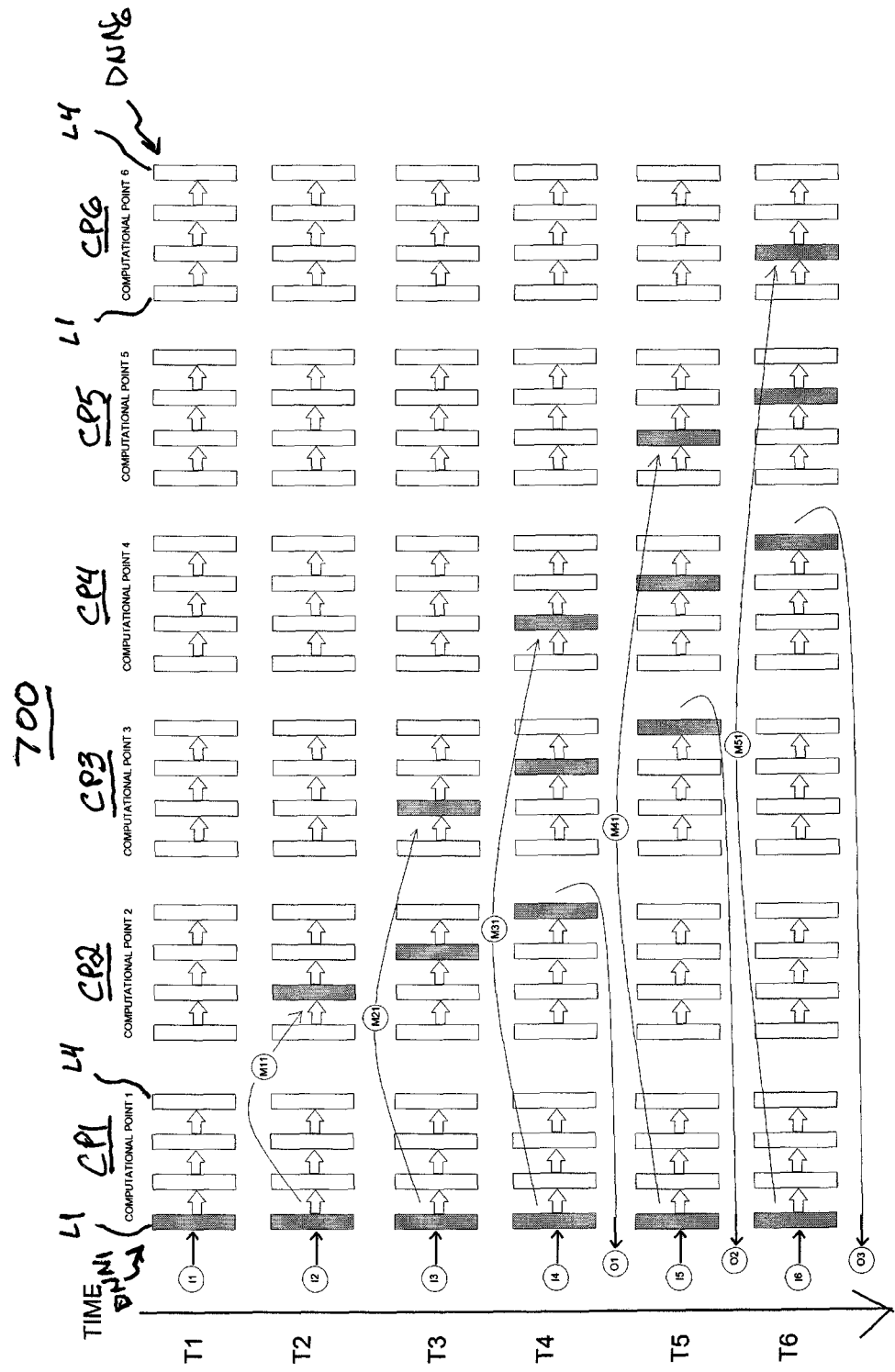
FIGS. 7-9, illustrative examples of illustrative DNN execution processes that are executed in real-time.
Figure 8:
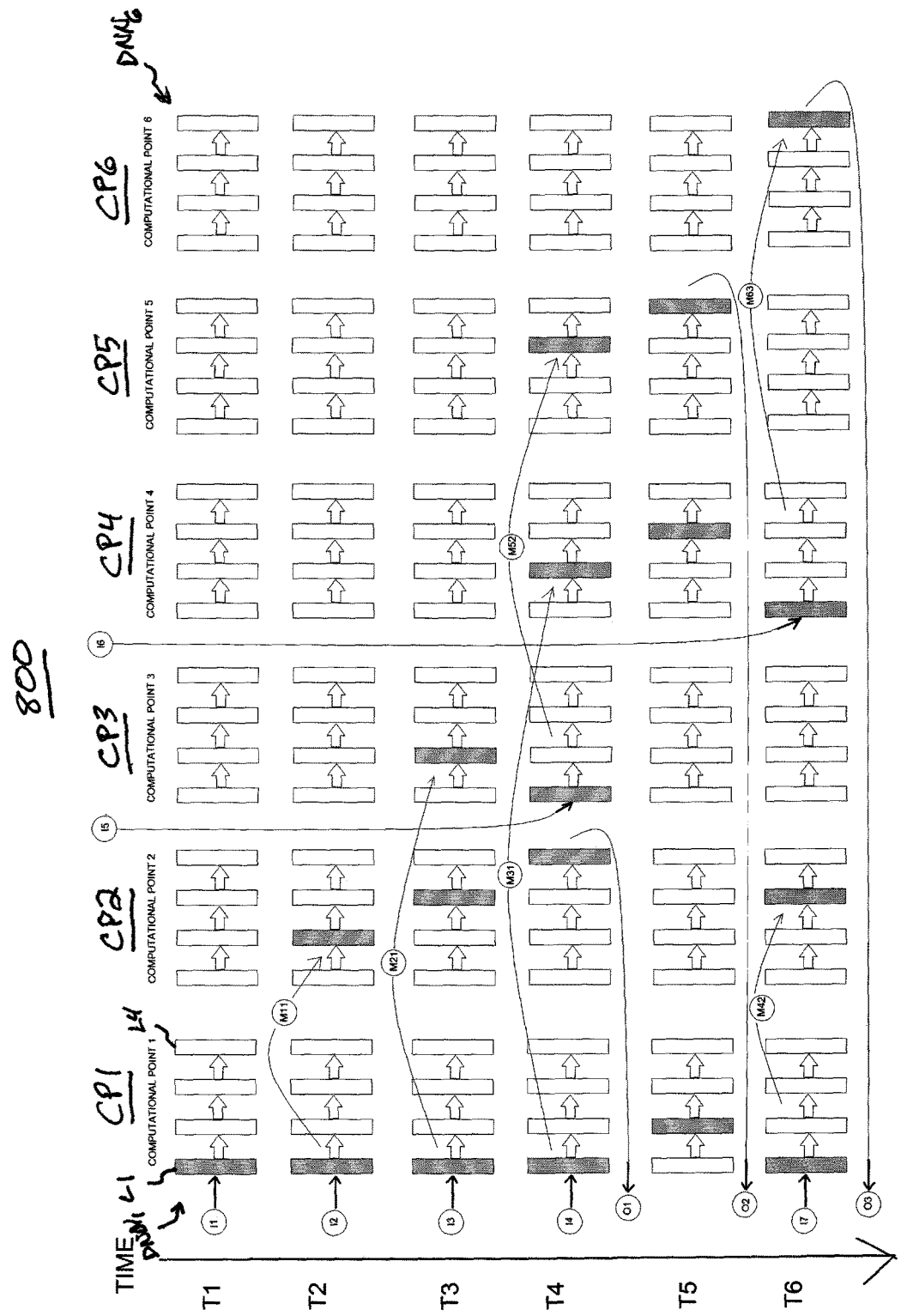
Figure 9:
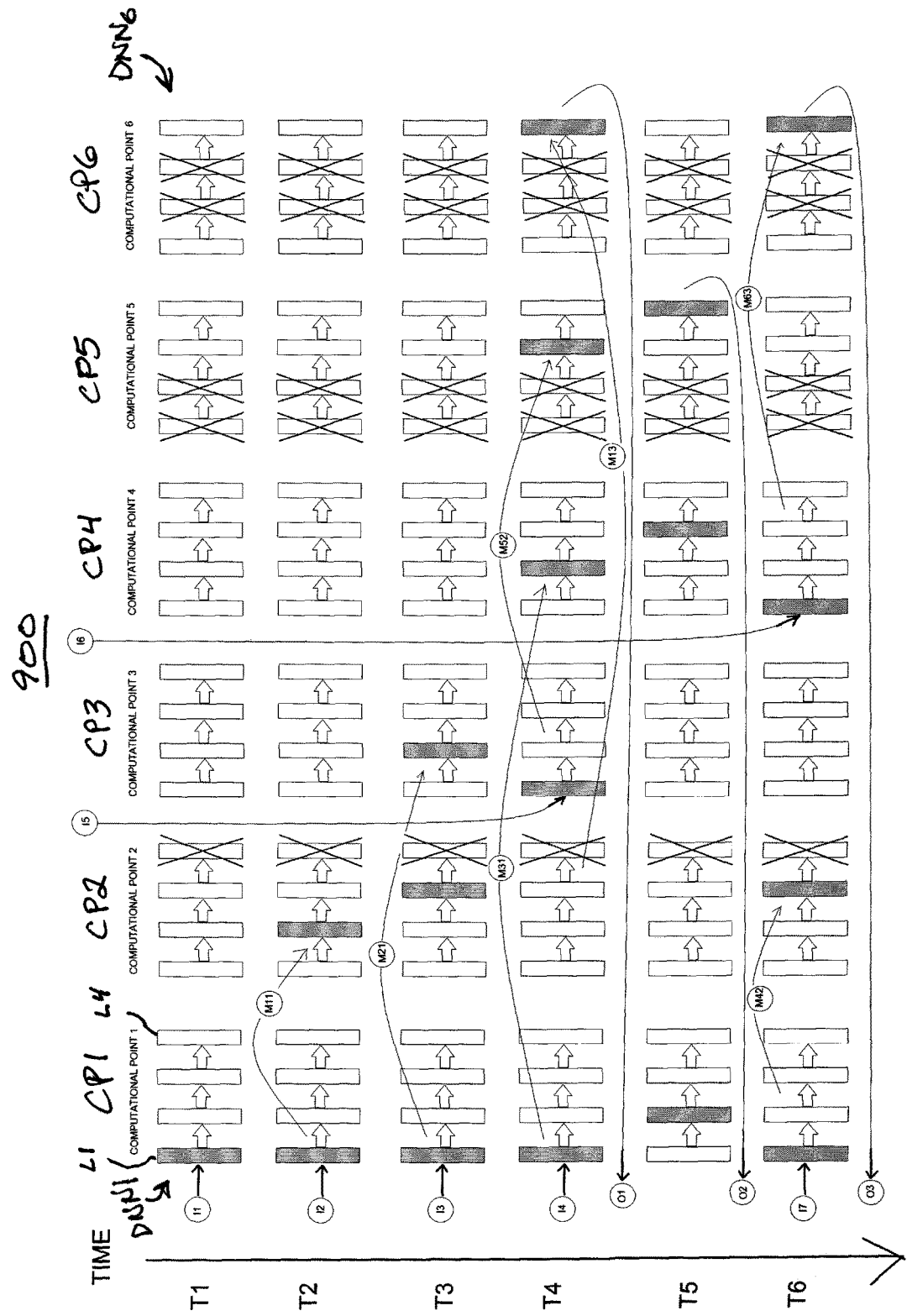

With regard to FIGS. 7-9, illustrative examples of illustrative DNN execution processes 700, 800, and 900 that are executed in real-time are shown.

In FIG. 7, a local area network may have six computational points CP1-CP6 (collectively CPs) executing on devices, such as imaging or other end-point devices, is provided. The CPs are configured to execute deep neural networks $DNN_1$-$DNN_6$ (collectively DNN or DNNs) each having been partitioned into four layers L1-L4 on the computation points CPs. In this example, only CP1 is acquiring images (I1 at time T1, . . . , I6 at time T6) from the local camera sensor and sending the currently available feature map (M11 at T2, . . . , M51 at T6) to the other CPs CP2-CP6 whenever a new image frame I2-I6 is ready to be processed by the $DNN_1$. The processing flow through CP1 is such that whenever a new input (image I2-I6) is available to be processed by the $DNN_1$, the $CP_1$ frees the $DNN_1$ and the local computing resources of the imager (i.e., CP1) by transmitting the first available feature map M11 to one of the other available CPs (e.g., CP2).

As shown, after a ramp-up (e.g., from time T4 onward), an output from the DNN can be generated at every time Ti, multiplying, in fact, the computational power of CP1 by the number of partitioned layers L1-L4. For example, CP2 generates output O1 at time T4, CP3 outputs O2 at time T5, and CP4 outputs O3 at time T6. The highlighted layers of the computational points CP2-CP6 are layers that are available to process the feature maps M11-M51 from CP1 or other of the CP2-CP6 as a result of having available resources.

With regard to FIG. 8, CP1-CP6 are operating, but in this example, CP1 is not the only computational point acquiring images. As shown, image I5 is acquired by CP3 at time T4, and image I6 by CP4 at time T6. Moreover, CP1 is not acquiring (or does not need to process) an image at time T5. As such, a feature map is not transferred from CP1 and L2 of $DNN_1$ may process the feature map initially processed by L1 of CP1 at time T5.

With regard to FIG. 9, a little difference is introduced by having some of the CPs not being capable of supporting all of the DNN's partitioned layers. For example, CP2 does not implement the last layer so cannot produce an output; CP5 does not implement the first two layers, so cannot acquire images nor process the first feature map (e.g., CP5 is not an imager, but possibly a laser scanner or another sensor without image acquisition capabilities); CP6 only supports the first and the last layers. It should be understood that possible missing layers may be explained by the fact that some imagers may have constraints on local available memory, so that those imagers are precluded from implementing some of the "heavier" layers of the DNNs.

Due to the various limitations of the DNNs, the processing flow through the involved imagers is now a little different, where the DNN process has to take into account the fact that a feature map can be sent only to a CP that actually implements the intended next layer of the DNN. Such processing and routing restrictions are not a problem because the limitations are known at design-time from the "CP deployment" phase. As with the process 800 of FIG. 8, after a ramp-up (e.g., from T4 onward), an output from the DNN can be generated at every time Ti, multiplying, in fact, the computational power of every acquiring imager (CP1, CP3 and CP4) by the number of partitioned layers L1-L4 (i.e., four). The processing flow through the three imagers CP1, CP3, and CP4 is functioning as usual by taking into account which devices are available (i.e., free) from time-to-time to provide computing resources.

Routing

The concept behind routing feature maps to devices within a local area network is to exploit available computational power on CPs on the LAN while avoiding to waste bandwidth and latency. Since moving data between CPs does not come for free in terms of time, it is important to avoid situations where 20% of total time, for example, is spent in computing against 80% of total time is spent transferring data. In order to match these relative percentages, the following points may be taken into consideration:

(a) Small-sized feature maps for routing are desirable.

(b) Transmitting any feature map to already busy CPs is generally avoided.

(c) More powerful CPs (i.e., CPs with higher bandwidth) are desirable when multiple CPs are available (d) Do not block (or free as soon as possible) any CP when multiple CPs are available.

(e) Queue requests when busy to serve the requests as soon as possible.

(f) Avoid using a central server for scheduling to avoid be a single point of failure.

Figure 10:
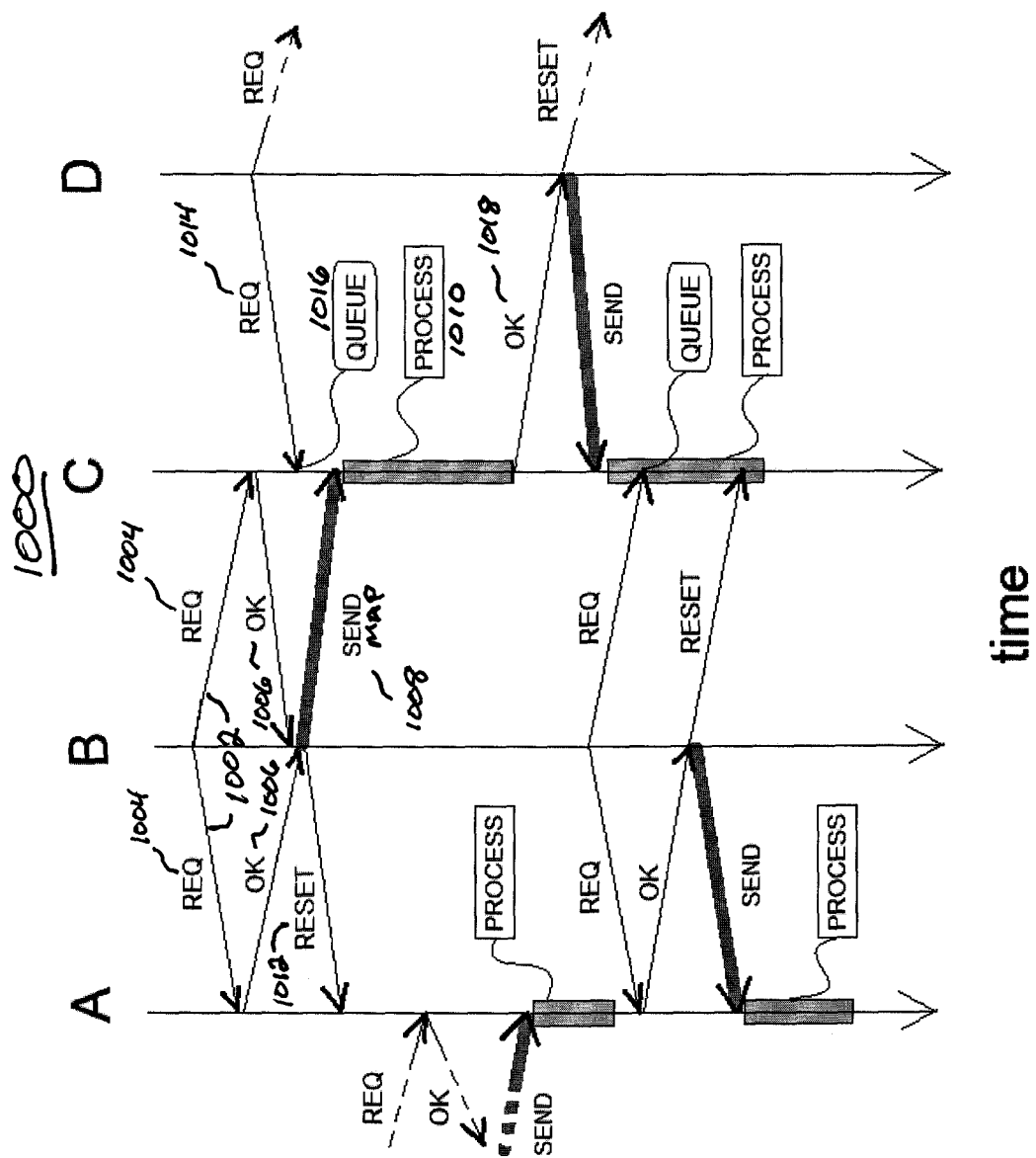
FIG. 10 is an illustrative peer-to-peer scheduling process for communicating feature maps.

With regard to FIG. 10, an illustrative peer-to-peer scheduling process 1000 for communicating feature maps is shown. In this case, four CPs A, B, C, and D are used to illustrate the peer-to-peer scheduling process 1000. As shown, when a CP (e.g. $CP_B$ first) needs routing for a feature map to be processed due to having no or limited resources, $CP_B$ is broadcast at step 1002 to the intended CPs (i.e., CPs containing the expected layer), a request "REQ" message 1004 in order to have an "OK" response 1006 by each of the free CPs (e.g., $CP_A$ and $CP_C$), to trigger soon the "SEND" phase 1008 and to begin a process phase 1010.

If more than one free CP gives an "OK" message 1006 to a single "REQ" message 1004 to an applicant CP (e.g., $CP_A$ and $CP_C$ to $CP_B$), then the applicant CP considers only the first received "OK" message (e.g., from $CP_C$ to $CP_A$) and the applicant CP responsively sends a "RESET" message 1012 to the other CPs that responded with the "OK" message 1006 to free the other CPs for other applicants (e.g., $CP_B$ to $CP_A$).

As shown, if $CP_C$ receives a "REQ" message 1014 while busy (e.g., "C" from "D" while serving $CP_A$ and from $CP_B$ to $CP_C$ while serving $CP_D$), then the busy $CP_C$ may queue the request at step 1016. When the current process phase 1010 is complete, $CP_C$ may send an "OK" message 1018 to the next CP, in this case $CP_D$. The next CP should be selected by following some criterion. As an example, a simple FIFO mode based on preferring the queued CP with more computing resources or preferring the CP whose connection weight, in terms of bandwidth and latencies already measured in previous interactions, is lower.

When an applicant CP receives an "OK" message after having sent the related "REQ" message to some other CP, then the applicant CP sends a "RESET" to all the other CPs (e.g. $CP_B$ resets $CP_C$ after having receive an "OK" message from $CP_A$). If a CP sends a "REQ" message that is not answered (e.g., $CP_D$ after being queued by $CP_C$), the CP can only wait (may be until a time-out), which means that other CPs are not reachable or the other CPs are all busy. In some cases, if the applicant CP of a "REQ" message later receives an "OK" message when the applicant CP no longer needs another CP (e.g., because the request was queued, but in the meantime, the applicant CP received another OK message or a time-out has expired), the applicant CP may simply "RESET" the requests.

With regard to using peer-to-peer (P2P) communications for handling routing of feature maps to other computing points in a local area network, apart from avoiding the single point of failure involved with using a central server or broker for routing a feature map, using a P2P communications paradigm allows for the flexibility of the process in the case of heterogeneous embedded devices. In fact, a criterion with which a CP may decide what is the first request to be served between those queued and, optionally, a criterion by which another CP may decide which CP to send the feature maps (i.e., among each of the CPs that are determined to be available), may depend on various network parameters, which may have dynamic values over time, that the individual CPs may learn in real-time through the example requests presented in FIG. 10.

As an example, the following dynamically changing parameters may be weighted at configuration time and evaluated from time-to-time in every (or only in some) node:

(a) The actual available bandwidth measured on a route path between two CPs.

(b) The actual response latency measured on a route path.

(c) The actual traffic on a path (estimated by the number of messages not of interest to the routing protocol, but which can predict efficiency drops on that route path).

With regard to triggering a feature map routing in a computational point, routing is performed whenever a CP has not yet finished to process a current layer of a local DNN, i.e. another image (from a local sensor) or feature map cannot be supplied as an input to the layer.

With regard to knowing, in every CP, which are the intended CPs for routing (e.g., those containing the expected layer), during an initial setup phase, each CP may be informed about each of the available layers of other CPs in order to send feature maps to pertinent CPs (i.e., to CPs that have the available layers). A related multicast communication may be implemented by a standard IP multicast protocol, which is typically performed using UDP as transport layer protocol.

With regard to latencies and synchronicity in the local area network, different delivery times, depending on time jitters and latencies on the network are to be considered. As a matter of fact, each of REQ, OK, and RESET messages may be received at unpredictable times. To manage and distinguish different routing protocol runs, it suffices to include, in the payload of messages, a sequence number (e.g., the same sequence number for every REQ, OK, RESET and SEND related to the same protocol run).

Figure 11:
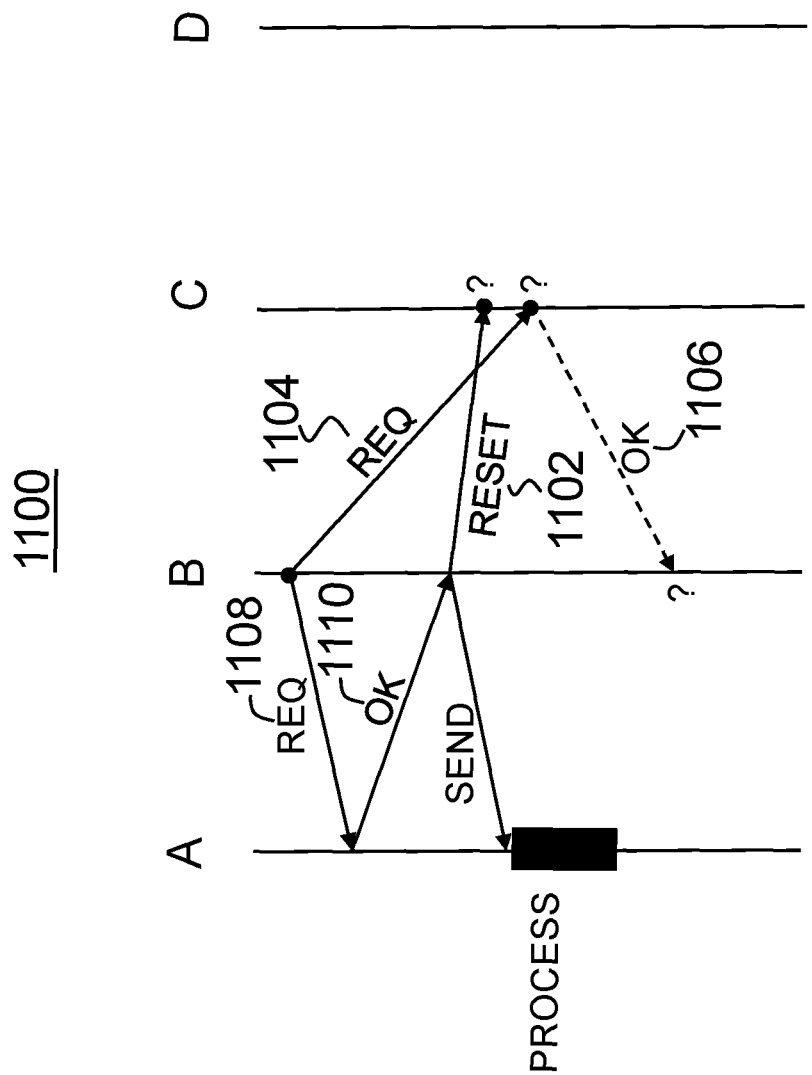
FIG. 11 is an illustrative timing diagram inclusive of a set of CPs along with illustrative communications between the CPs.

With regard to FIG. 11, an illustrative timing diagram 1100 inclusive of a set of CPs, $CP_A$-$CP_D$, along with illustrative communications between the CPs is shown. As shown, a "RESET" message 1102 is received by $CP_C$ before the REQ message 1104 from $CP_B$ is received. $CP_C$ may answer with an OK message 1106 to the received REQ message 1104 while a REQ message 1108 from $CP_B$ has already been responded to with an OK message 1110 by $CP_A$. Such a timing situation is not a problem as $CP_B$ sends the RESET message 1102 to $CP_C$ after receiving the OK message 1110 from $CP_A$, $CP_B$ thereafter may ignore every later OK message from $CP_C$ or from any other node. Also, the timing is not a problem for $CP_C$, which received the RESET message 1102 before the REQ message 1104 as $CP_C$ simply resets the current protocol run, and then, when receiving the REQ message 1104 related to the same protocol run, $CP_C$ ignores the REQ message 1104. Messages from different protocol runs are discriminated by the carried sequence number.

Figure 12:
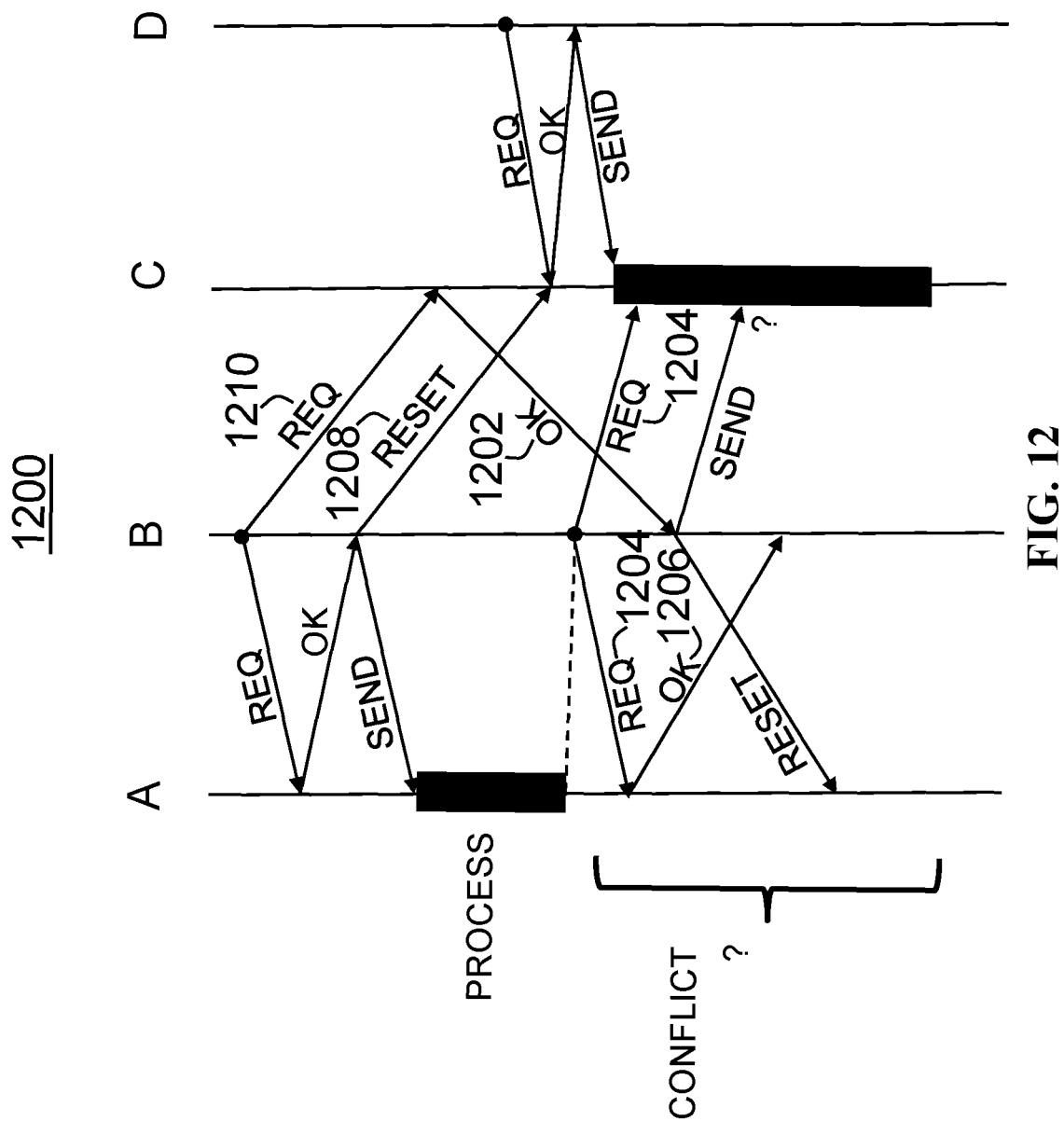
FIG. 12 is a timing diagram showing computational points with illustrative communications between the CPs.

With regard to FIG. 12, a timing diagram 1200 showing computational points $CP_A$-$CP_D$ with illustrative communications between the CPs is shown. In this example, applicant $CP_B$ later receives an OK message 1202 when $CP_C$ no longer needs to offload a feature map because $CP_C$ was not selected by $CP_B$ to process the feature map. However, in the meanwhile $CP_B$ sent another REQ message 1204, thereby starting a new protocol run with updated sequence number. Such a potential communications conflict is not a problem due to the carried sequence number, as the later OK message 1206 is ignored from $CP_B$ due to referring to an old protocol run. Also, the timing is not a problem for $CP_C$, which relies on the RESET message 1208 from $CP_B$ to close the protocol run related to the sequence number carried by an original REQ message 1210 from $CP_B$, so, again, no conflict arises.

In summary, one embodiment of a method of executing a deep neural network (DNN) in a local area network (LAN) may include executing a partitioned deep neural network in multiple computational nodes (CPs) in devices operating on the LAN. An image frame may be captured by a device operating on the LAN. The image frame may be processed by a first layer of the partitioned neural network by a computational point operating on the device that captured the image frame. In response to the device that captured the image frame determining to request processing assistance from another CP, a request using a peer-to-peer protocol to other CPs on the LAN may be performed. A feature map may be communicated to another CP selected using the peer-to-peer protocol to process the feature map by a next layer of the DNN.

The process may further include partitioning the DNN, and deploying the DNN partitions into computational points of the devices for execution thereby. The partitioned DNN may be executed on the computational points includes simultaneously executing a map routing task and DNN processing task. The process may further include determining, by the device that captured the image, that insufficient resources exist on a CP of that device to be able to process the feature map.

In an embodiment, performing a request using a peer-to-peer protocol may include communicating a broadcast message to each of the other CPs operating in devices on the LAN. In communicating a broadcast message, the process may further include communicating a broadcast message that is limited to be communicated to other devices that have a layer of the DNN that is configured to process the feature map. The process may further include receiving an OK message from multiple devices available to process the feature map, and selecting a device to which to send the feature map for processing thereby. Selecting may include selecting based on timing of the OK messages being received. Selecting may alternatively include selecting based on processing power of each of the CPs that sent an OK message. The process may further include sending a reset message to each of the devices not selected to process the feature map.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A method of executing a deep neural network (DNN) in a local area network (LAN), said method comprising:
   executing a partitioned deep neural network in multiple computational points or nodes (CPs) in devices operating on the LAN, the CPs inclusive of multiple layers of the DNN that are individually accessible to perform data processing;
   capturing an image frame by a device;
   processing the image frame by a first layer of the partitioned neural network of a CP operating on the device that captured the image frame;
   in response to the device that captured the image frame determining to request processing assistance from one or more other CPs on other corresponding devices, performing a request using a peer-to-peer protocol to the other CPs with a selected layer on the LAN;
   receiving an OK message from multiple CPs operating on at least one of the devices that have a next layer that is available to process a feature map of the captured image frame; and
   selecting one or more CPs from among the other CPs based on at least one of timing of the OK messages being received from the CPs or processing power of each CP that sends an OK message in response to the request; and
   communicating the feature map of the captured image frame to the selected one or more CPs using the peer-to-peer protocol to process the feature map by the next layer of the partitioned DNN executing on the selected one or more CPs, the feature map bypassing the first layer of the selected CP.

2. The method according to claim 1, further comprising:
   partitioning the DNN into the multiple layers that are individually accessible and executable to perform processing of the image frame or feature map; and
   deploying the DNN partitions into the CPs in the devices for execution thereby.

3. The method according to claim 1, wherein executing the partitioned DNN on the computational points includes simultaneously executing a map routing task to route feature maps when a determination is made by the CP that additional resources are needed to processing bandwidth limitations and DNN processing task.

4. The method according to claim 1, further comprising determining, by the device that captured the image, that insufficient resources exist on a CP on which the first or next layer is processing the image frame or feature map to be able to process the feature map.

5. The method according to claim 1, wherein performing a request using the peer-to-peer protocol includes communicating a broadcast message to each of the other CPs operating in devices on the LAN.

6. The method according to claim 5, wherein communicating a broadcast message further includes communicating a broadcast message that is limited to be communicated to other devices that have a next layer from a current layer of the DNN that is individually accessible and available to process the feature map.

7. The method according to claim 1, further comprising sending a reset message to each of the CPs operating on the devices not selected to process the feature map.

8. A system for executing a deep neural network (DNN) in a local area network (LAN), said system comprising: a plurality of devices operating on the LAN, the devices executing computational points (CPs) that are configured to execute a partitioned deep neural network thereby, the CPs inclusive of multiple layers of the DNN that are individually accessible to perform data processing; and a device of the devices operating on the LAN capturing an image frame, a computational point of the partitioned neural network operating on the device being configured to: process the image frame by a first layer; in response to the device that captured the image frame determining to request processing assistance from one or more other CPs on other corresponding devices, performing a request using a peer-to-peer protocol to the other CPs with selected layer on the LAN;

receive an OK message from multiple CPs operating on at least one of the devices that have a next layer that is available to process a feature map of the captured image frame; and select one or more CPs from among the other CPs based on at least one of timing of the OK messages being received from the CPs or processing power of each CP that sends an OK message in response to the request; and communicate the feature map of the captured image frame to the selected one or more CPs using the peer-to-peer protocol to process the feature map by the next layer of the partitioned DNN executing on the selected one or more CPs, the feature map bypassing the first layer of the selected CP.

9. The system according to claim 8, wherein the CP of each device operating on the LAN is further configured to execute the DNN partitions.

10. The system according to claim 8, wherein the device, in executing the partitioned DNN on the computational point, is further configured to simultaneously execute a map routing task and DNN processing task.

11. The system according to claim 8, wherein the device, in determining to request processing assistance, is further configured to determine that insufficient resources exist on that CP to be able to process the feature map.

12. The system according to claim 8, wherein the device, in performing a request using a peer-to-peer protocol, is further configured to communicate a broadcast message to each of the other devices operating CPs on the LAN.

13. The system according to claim 12, wherein the device, in communicating a broadcast message, is further configured to communicate a broadcast message that is limited to be communicated to other devices that have a next layer from a current layer of the DNN that is individually accessible and available to process the feature map.

14. The system according to clean 8, further comprising sending a reset message to each of the CPs operating on the devices not selected to process the feature map.

* * * * *